Oct. 4, 1938.    E. T. PARSONS ET AL    2,132,123
COVER FOR DOUGH WORKING SURFACES
Filed June 1, 1936    2 Sheets-Sheet 2
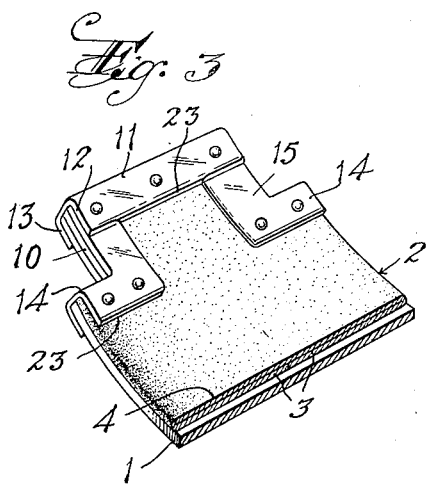
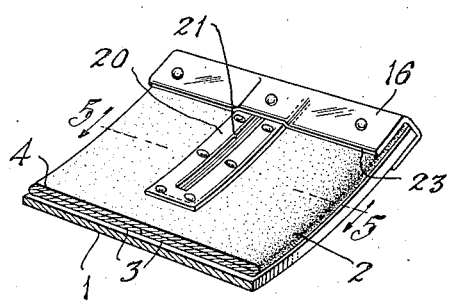
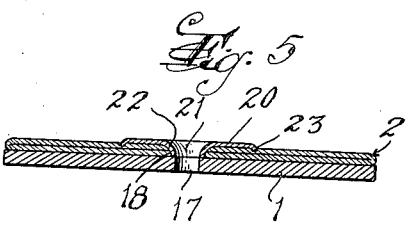
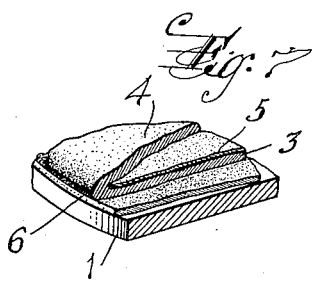
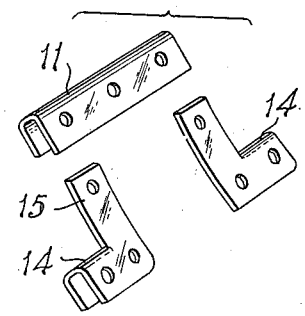
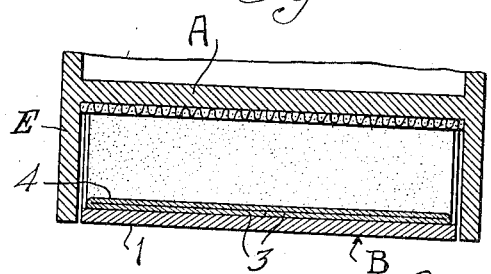
INVENTORS
Edward T. Parsons and
Hilon Willard Sawyer,
BY Harry B. Rook ATTORNEY Patented Oct. 4, 1938

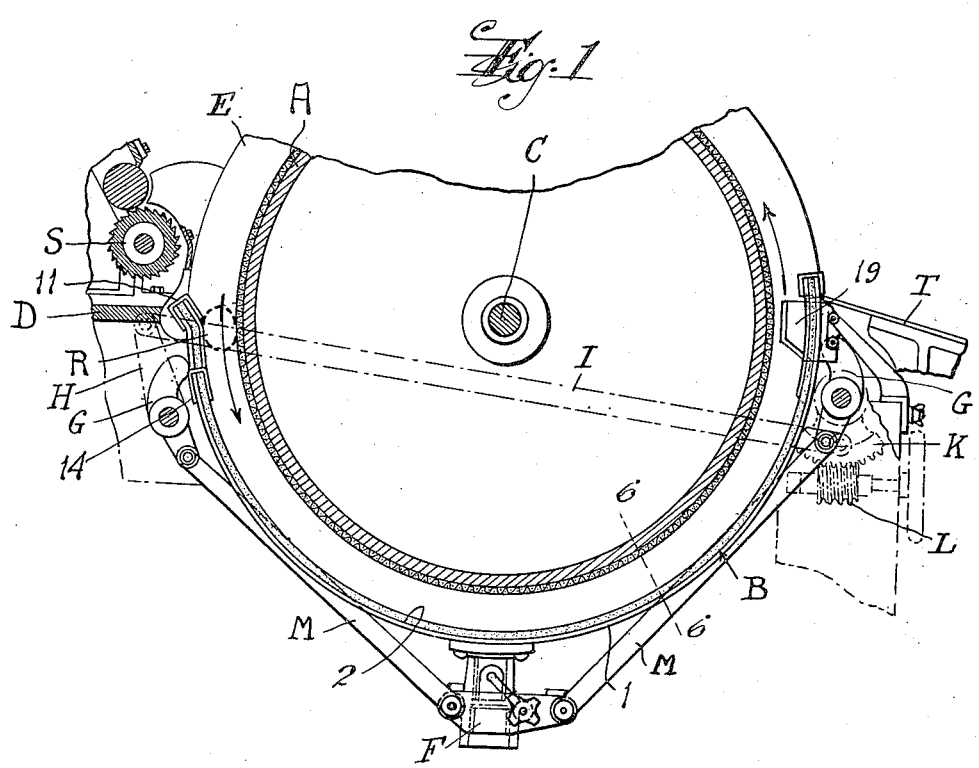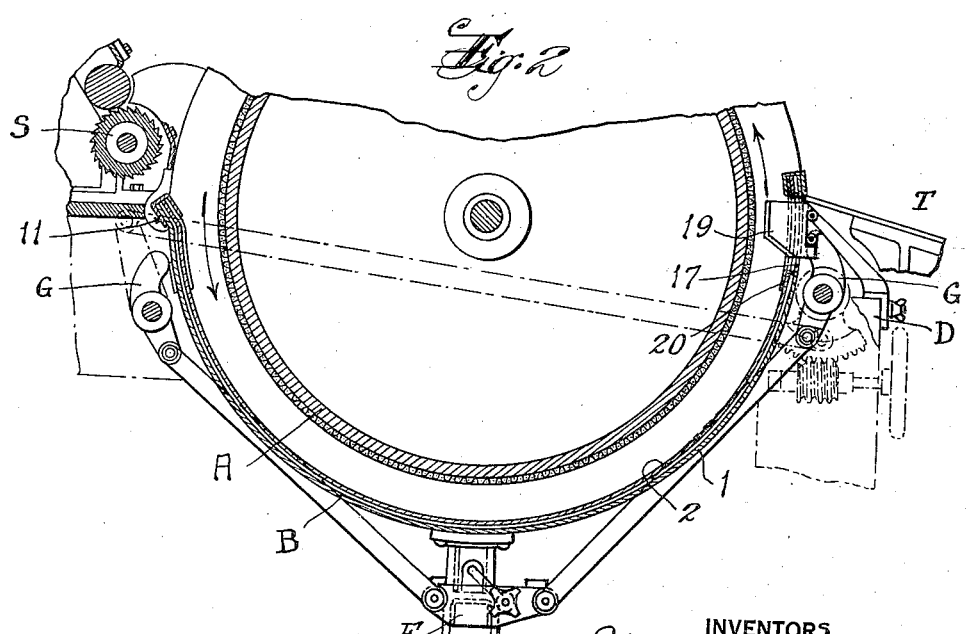

2,132,123

UNITED STATES PATENT OFFICE 2,132,123

COVER FOR DOUGH WORKING SURFACES

Edward T. Parsons, Upper Montclair, and Hilon Willard Sawyer, Nutley, N. J., assignors to Thomson Machine Company, Belleville, N. J., a corporation of New Jersey Application June 1, 1936, Serial No. 82,905

5 Claims. (Cl. 107—9)

This invention relates in general to dough working machines and more particularly to a machine wherein a roll of dough is molded or kneaded into a loaf between two relatively moving surfaces, for example, a rotating drum and an arcuate compression plate disposed in spaced relation to the periphery of the drum, as shown in United States Patent No. 701,646, dated June 3, 1902.

In such dough working machines one or both of the two molding surfaces of the two molding elements, e. g., the drum and compression plate, is provided with a fabric cover, for example canvas or felt, and this cover generally has been secured to the molding element by rivets, or strips of metal. The fabric covering in time absorbs moisture from the dough during the molding operation which causes insanitary conditions; and upon drying of the fabric it shrinks and becomes rippled or buckled and frequently is torn away from the rivets or other fastening means. The uneven rippled or buckled surface is objectionable, and of course the tearing away of the covering requires repair or a new cover. Also, the cover has usually been left with raw or frayed edges which result from the cutting of the fabric from larger pieces, and these frayed edges collect moisture, flour and dust and also continue fraying during use so as to in time render the covering useless.

Therefore, prime objects of our present invention are to provide a novel and improved cover for dough contacting surfaces of dough molding elements whereby absorption of moisture and shrinking of the fabric covering shall be reduced to the minimum; and to provide a novel and improved covering of this character which shall have no frayed or raw edges.

The compression plates are frequently interchanged, and when the plates are removed from a molding machine they are set on a floor or other support. When the compression plates are arcuate, the plates are usually set with their end edges resting on the supporting surface, and repeated handling of the plates results in wearing and tearing of the edges of the fabric element as well as detachment thereof from the metal plate to which the cover is secured.

Therefore, another object of our invention is to provide a novel and improved metal binding for the edges of a compression plate to prevent wear and tear of the edges of the fabric covering, for example by contact with a supporting surface.

Other objects, advantages and results of the invention will appear from the following description when considered in conjunction with the following drawings in which Figure 1 is an edge elevation of a compression plate embodying the invention schematically illustrated in combination with a molding drum.

Figure 2 is a longitudinal sectional view through the compression plate.

Figures 3 and 4 are fragmentary perspective views of the opposite ends of the compression plate.

Figure 5 is a transverse sectional view on the line 5—5 of Figure 4.

Figure 6 is a transverse sectional view on the line 6—6 of Figure 1.

Figure 7 is a fragmentary sectional perspective view through the compression plate and covering showing the adhesive layers for securing the plies of the cover together and the cover to the plate, and Figure 8 is a composite perspective view of the binding strips for the receiving end of the compression plate.

Specifically describing the illustrated embodiment of the invention, the reference character A designates a molding drum of a dough molding machine of the general character shown in Patent No. 701,646 and B represents the arcuate compression plate embodying the invention which cooperates with the drum in molding a roll of dough. As shown, the drum has a shaft C which is journaled on a frame D, and the compression plate B is adjustably supported on the frame D to be moved toward and from the drum. The compresion plate is disposed between the end flanges E of the drum and adjustably supported on the frame D for movement toward and from the periphery of the drum, by a stirrup F and bell cranks G, the bell cranks and stirrup being actuated through a crank arm H connected to one of the bell cranks and a gear segment K connected to the other bell crank and operated by a worm L. Synchronous operation of the bell cranks is caused by connection of the gear segment K and crank H by a link I, and simultaneous operation of the bell cranks and stirrup F is produced by links M connecting the stirrup to the respective bell cranks. This supporting and operating mechanism for the compression plate forms no part of the present invention and need not further be described.

In operation of the machine a roll of dough R is deposited from the sheeting and curling mechanism generally designated S into the space between the molding drum and the compression plate and the roll is rolled in the direction of the arrows and discharged at the other end of the compression plate upon a tray T.

One important feature of the invention is the construction of the compression plate B. As shown, this compression plate includes an arcuate sheet metal plate 1 and a fabric cover 2 preferably formed of canvas, felt or other suitable material. Preferably the cover 2 is formed of two thicknesses of material and this may be accomplished and at the same time raw or frayed edges may be eliminated by folding the edge portions 3 of the strip inwardly over the main portion 4 into edgewise abutting relation as clearly shown in Figures 3, 4 and 6. A layer of adhesive unvulcanized caoutchouc composition 5 is disposed between the contacting surfaces of the edge portions 3 and main portion 4 and is of a consistency to permeate those contacting surfaces. Upon drying of the composition, the plies 3 and 4 of the cover are firmly secured together, and the composition being waterproof or water-repellant prevents moisture from soaking through the cover from the dough contacting main portion 4.

The cover so formed is applied to the concave surface of the compression plate by another layer 6 of similar adhesive unvulcanized caoutchouc composition of a relatively heavier consistency, the edge portions 3 facing the plate 1. With this construction, the cover may be smoothly applied to the compression plate without wrinkles or ripples and will be firmly secured throughout to the plate. In view of the fact that the adhesive caoutchouc composition will prevent soaking of moisture from the dough contacting ply 4 to the underlying plies 3, there will be a minimum of shrinkage of the plies 3 and 4 and thereby a minimum tendency for the cover to pull itself away from the metal plate 1. Accordingly, the invention makes it possible to apply the cover to the metal plate in a manner much superior to that heretofore possible and without the use of rivets, metal strips or like fastening devices. The folds of the strip of material forming the cover are disposed along the longitudinal sides of the plate 6 so that no raw or frayed edges are present, and another feature of the invention is the elimination of frayed edges at the ends of the compression plate and protecting the edges of the cover from wear and tear due to handling of the compression plate and setting and moving it upon a surface when the plate is out of use.

The receiving end of the compression plate is usually cut away to form a reduced tongue extension 10. The extremity of the extension 10 has a channel-shaped binding strip 11 of metal applied in embracing relation thereto with the flanges 12 and 13 overlying the end portion of the fabric cover and the opposite side of the plate 1, respectively. The edges of the plate at the base of the tongue extension 10 have channel-shaped binding strips 14 secured thereto and each strip has an extension 15 running along the corresponding side edge of the tongue 10. Preferably the binding strips are secured to the plate by fastening devices such as rivets passing through the flanges of the strips, the cover and the plate 1.

The other end of the plate is similarly protected by a U-shaped binding strip 16 which embraces the end of the plate.

Frequently the compression plate is used in conjunction with a cutter for severing a roll of dough intermediate its ends into two pieces, for example as shown in Patent No. 1,641,781 dated September 6, 1927. In such cases the discharge end of the compression plate has a longitudinal slot 17 and the fabric cover has a registering slot 18. A cutter 19 is mounted on the frame of the molding machine and projects through the slots 17 and 18 toward the periphery of the drum so that as a roll of dough passes the cutter upon discharge of the roll, the roll is severed into two pieces. In accordance with the invention, the edges of the slot 18 in the cover are protected by an escutcheon plate 20 which overlies the cover adjacent the edges of the slot and has a slot 21 registering with the slots 17 and 18. The portions 22 of the escutcheon plate adjacent the edges of the slot 21 are turned inwardly over the raw edges of the cover at the slot 18 so as to protect said edges from wear and from becoming frayed, for example, by contact with the cutter 19. Preferably the escutcheon plate is riveted to the metal plate 1 and one end is disposed beneath the flange of the end binding strip 16 as clearly shown in Figure 4.

In all cases, the edges of the escutcheon plate and the flanges of the binding strips 11, 14 and 16 are caulked or pressed as at 23 into the fabric cover and rounded so as to reduce to the minimum accumulations of flour, dough, and dust at the meeting points of the plate and flanges with the fabric cover, and also to avoid cutting of the "skin" of the roll of dough as it passes over the edges of the plate and strips.

The composition of the adhesive layers 5 and 6 may be varied, but an important characteristic thereof is the presence of raw rubber, caoutchouc or latex which after setting or hardening is waterproof and prevents soaking of moisture into the fabric cover, has an affinity for the steel plate 1 and holds the fabric firmly and smoothly in position, is chemically inert to the ingredients of the dough, and therefore maintains the cover in sanitary and good working condition for long periods of time.

While we have shown and described our invention as embodied in certain details of construction it should be understood that this is primarily for the purpose of illustrating the principles of the invention and that the details of structure may be modified and changed by those skilled in the art without departing from the spirit or scope of the invention. Also, the invention may be utilized in providing a dough contacting cover for the drum A or other molding elements.

Having thus described our invention what we claim is:

1. A compression plate for dough molding machines comprising a metal plate, and a cover consisting of a strip of fabric having its longitudinal edge portions returned upon the main portion, a layer of unvulcanized adhesive caoutchouc composition between said edge portions and said main portion of a consistency to impregnate the contacting surfaces of said edge portions and said main portion, said cover being laid upon the plate with said edge portions facing the plate, and a layer of unvulcanized adhesive caoutchouc composition of relatively heavier consistency between said edge portions and said plate for securing the cover to the plate.

2. The compression plate set forth in claim 1 with the addition of metal binding strips embracing the ends of said plate and the corresponding ends of said fabric cover to conceal and protect the edges of said cover.

3. The compression plate set forth in claim 1 with the addition of channel-shaped metal binding strips embracing the ends of said plate and the corresponding ends of the fabric cover, the flanges of each channel strip overlying respectively the cover and the opposite side of the metal plate.

4. A compression plate for dough molding machines including a metal plate, a fabric cover on one side thereof, and a channel-shaped metal binding strip embracing one end of said plate and the corresponding end of said cover with the flanges of the strip overlying respectively the cover and the opposite side of the plate, and fastening members passing through said flanges, cover and plate.

5. A compression plate for dough molding machines including a metal plate having a slot adjacent one end to receive a cutter, a fabric cover on one side of the plate having a slot registering with the slot in the plate, a metal escutcheon strip overlying said cover and having a slot registering with said slot in the cover and portions of the strip adjacent said slot turned inwardly over the edges of the slot in said fabric cover, and a channel-shaped metal binding strip embracing the end of said plate and said cover with its flanges overlying respectively the cover and said escutcheon strip and the opposite side of the plate.

EDWARD T. PARSONS.
H. W. SAWYER.